United States Patent [19]

Wupper et al.

[11] Patent Number: 4,693,522
[45] Date of Patent: Sep. 15, 1987

[54] PROCESS AND CIRCUIT ARRANGEMENT FOR ADAPTING SLIP CONTROL TO THE MOMENTARY FRICTION VALUE

[75] Inventors: Hans Wupper, Friedrichsdorf; Gunther Buschmann, Idstein, both of Fed. Rep. of Germany

[73] Assignee: Alfred Teves GmbH, Frankfurt am Main, Fed. Rep. of Germany

[21] Appl. No.: 818,614

[22] Filed: Jan. 13, 1986

[30] Foreign Application Priority Data

Jan. 11, 1985 [DE] Fed. Rep. of Germany ........ 3500745

[51] Int. Cl.$^4$ .............................................. B60T 8/70
[52] U.S. Cl. .................................... 303/105; 303/106; 303/108; 303/DIG. 4; 364/426
[58] Field of Search ....................... 303/95, 96, 97, 98, 303/20, 99, 100, 103, 105, 106, 110, 107–109, 111, DIGS. 1–4; 364/424, 426; 188/181; 180/197

[56] References Cited

U.S. PATENT DOCUMENTS

| | | | |
|---|---|---|---|
| 3,545,817 | 12/1970 | Yarber | 303/108 X |
| 3,586,387 | 6/1971 | Riordan et al. | 188/181 A X |
| 4,451,096 | 5/1984 | Gygax | 303/109 |
| 4,489,382 | 12/1984 | Jonner et al. | 303/103 X |
| 4,566,737 | 1/1986 | Masaki et al. | 303/109 |

FOREIGN PATENT DOCUMENTS

| | | |
|---|---|---|
| 2050328 | 4/1972 | Fed. Rep. of Germany . |
| 2136440 | 2/1973 | Fed. Rep. of Germany . |
| 2254295 | 5/1974 | Fed. Rep. of Germany . |
| 2447182 | 4/1976 | Fed. Rep. of Germany . |
| 2717383 | 11/1978 | Fed. Rep. of Germany . |

OTHER PUBLICATIONS

DE-2: Bosch, Technische Berichte, H.2, 1980, S. 67–72.

*Primary Examiner*—Douglas C. Butler
*Attorney, Agent, or Firm*—James B. Raden; William J. Michals

[57] ABSTRACT

A control circuit for adapting slip control of an anti-skid brake system of an automotive vehicle comprising a friction coefficient identification circuit (31, 31'). Upon the instabilization of a wheel the braking pressure control signals controlling the slip by actuating solenoid valves (36–41) are varied by the output signal of the circuit (31, 31') as a function of the momentary deceleration ($v_R$) of the fastest wheel and/or on the momentary pressure in the hydraulic brake circuits (52, 53, 54) and thus are adapted to the momentary friction coefficient, which in particular depends on the road condition. In one instance, the gradient of the vehicular reference velocity is varied in dependence on the friction coefficient.

6 Claims, 8 Drawing Figures

PROCESS AND CIRCUIT ARRANGEMENT FOR ADAPTING SLIP CONTROL TO THE MOMENTARY FRICTION VALUE

BACKGROUND OF THE INVENTION

This invention relates to a process for adapting slip control of an anti-skid brake system of automotive vehicles to the momentary friction coefficient or friction value between road surface and tires. The rotational behavior of the vehicle's wheels and the vehicular velocity of a derived value are measured. Braking force or braking pressure control signals are generated from the measured signals by means of logical combination and signal processing, upon the instabilization of a wheel, that is, upon the identification of a lock-up tendency. The braking force at the respective wheel is kept constant or reduced and reincreased at the appropriate time by means of said control signals. Processes with additional measurement of the braking force or of the braking pressure as well as circuit arrangements for carrying out the processes are also included.

A friction coefficient adapting circuit provided for anti-skid brake systems of automotive vehicles is kown. The circuit has several timing elements connected in series. One of the timing elements is energized when the skid threshold is reached, the following timing elements being energized as a function of reaching of the reacceleration threshold at the end of predetermined hold times (DE-PS=German Patent Specification No. 21 36 440). In this way only the pressure reduction phase is varied as a function of the reaccelerating behavior of the instabilized wheel.

Another known circuit for controlling the braking pressure in anti-skid brake systems of automotive vehicles in the initial phase is provided with a measuring device for the detection of the friction coefficient. By means of the device the time is measured which elapses between the end of a rotational acceleration signal and the occurrence of a rotational deceleration signal at the controlled wheel and is evaluated as a criterion of the friction value or friction coefficient (German Patent Specification=DE-PS No. 27 17 383). According to this known circuit, friction value adaptation only starts after the reacceleration and renewed deceleration or rather instabilization of the controlled wheel—i.e., at a relatively late moment.

It is thus an object of this invention to avoid the disadvantages of known circuits and to develop a process for adapting slip control to the respective road condition or rather to the adhesive value or friction value between road surface and tires which each time is achievable in order to effect an optimum slowing-down, said slip control starting immediately upon the occurrence of a first instability of a wheel (in case of an intact brake dimensioning this will be a front wheel) and favorably influencing the braking pressure variation in accordance with the friction value existent or detected, respectively.

SUMMARY OF THE INVENTION

This object is achieved in a simple and technically advanced manner by means of a process of the type described wherein upon the instabilization of a wheel, the velocity and deceleration of the momentarily fastest wheel are evaluated as criteria of the vehicular velocity and vehicular deceleration. The momentary friction value is derived from the values and as a function of the friction value, slip control or rather the braking force or pressure modulation is adjusted to a control scheme or control program, adapted to the friction value level, or rather to an adapted program flow.

According to an advantageous embodiment of this invention at the time of identification of a lock-up tendency and of the onset of slip control the deceleration of the fastest wheel is detected and evaluated as a criterion of the momentary friction value. According to a further embodiment, due to the dimensioning and/or adjustment of the wheel brakes, a higher braking force is always applied to the front wheels than to the rear wheels and only at the time of the first instability of a front wheel caused by a braking operation the deceleration of the fastest rear wheel is evaluated as a criterion of the momentary friction value or of the friction value momentarily achievable.

While up to now the road condition could be detected and control could be varied correspondingly at the earliest after an instabilization and reacceleration of a wheel, according to this invention, slip control is adapted to the road condition and to the other conditions influencing the friction value after the first instabilization of a wheel (of a front wheel in general). In doing so, upon the first instabilization it is possible to determine the vehicular velocity and vehicular deceleration in a very simple and accurate manner by observing the vehicle's wheel which is the fastest at that moment. Hence, direct conclusions are possible with regard to the road condition and to the friction value. Normally the front axle has a higher adherence ability than the rear axle, at the moment when a first lock-up tendency occurs at the front axle it is possible to obtain a safe information on the vehicular velocity and deceleration from the rotational behavior of the rear wheels and, particularly, of the fastest rear wheel. If, for example, a lock-up tendency is noted at the front axle as early as in the case of a small vehicular deceleration this will be an indication of a slippery road surface or rather of a low friction value (of approximately the deceleration's magnitude in "g"). Thus a pressure modulation for controlling the slip should take place on a low pressure level so that, among other things, the energy consumption of the brake system is kept low and pressure variations are avoided during the controlled braking operation which impair driving comfort.

According to a variant of the inventive process the momentary braking force of the braking pressure is measured by means of sensors and is evaluated as a criterion of the road condition or rather of the friction value of friction coefficient when here occurs an instability for the first time, then—as a function of the friction value—the slip control or rather the braking force or braking pressure modulation is adjusted to a control scheme or control program adapted to the friction value level. The deceleration of the wheel which is the fastest at the time of the first instability can be measured here in addition and taken into consideration when determining the friction value.

Further, according to a further embodiment of this invention, it is possible to derive a criterion by means of braking force or braking pressure sensors, with the criterion allowing a differentiation between influences of the engine torque or the influence of a trouble on the rotational behavior of the wheels and braking effects. Without such measures or rather without using such sensors, in some cases it will be difficult to unquivocally determine whether, for example, in certain situations the vehicular reference velocity momentarily does not provide any usable reference value or whether a wheel has become instable due to the engine's braking torque. Troubles on the road surface, lateral slip, defects of the brakes or wheel bearings, etc. likewise may simulate situations which thanks to the additional braking force or braking pressure sensors, may be told in a simple manner from control-releasing conditions.

BRIEF DESCRIPTION OF THE DRAWING

Further characteristics, advantages, and applications of this invention will become evident from the following description of preferred embodiments when taken in conjunction with the acompanying drawing wherein.

DETAILED DESCRIPTION

Figure 1:
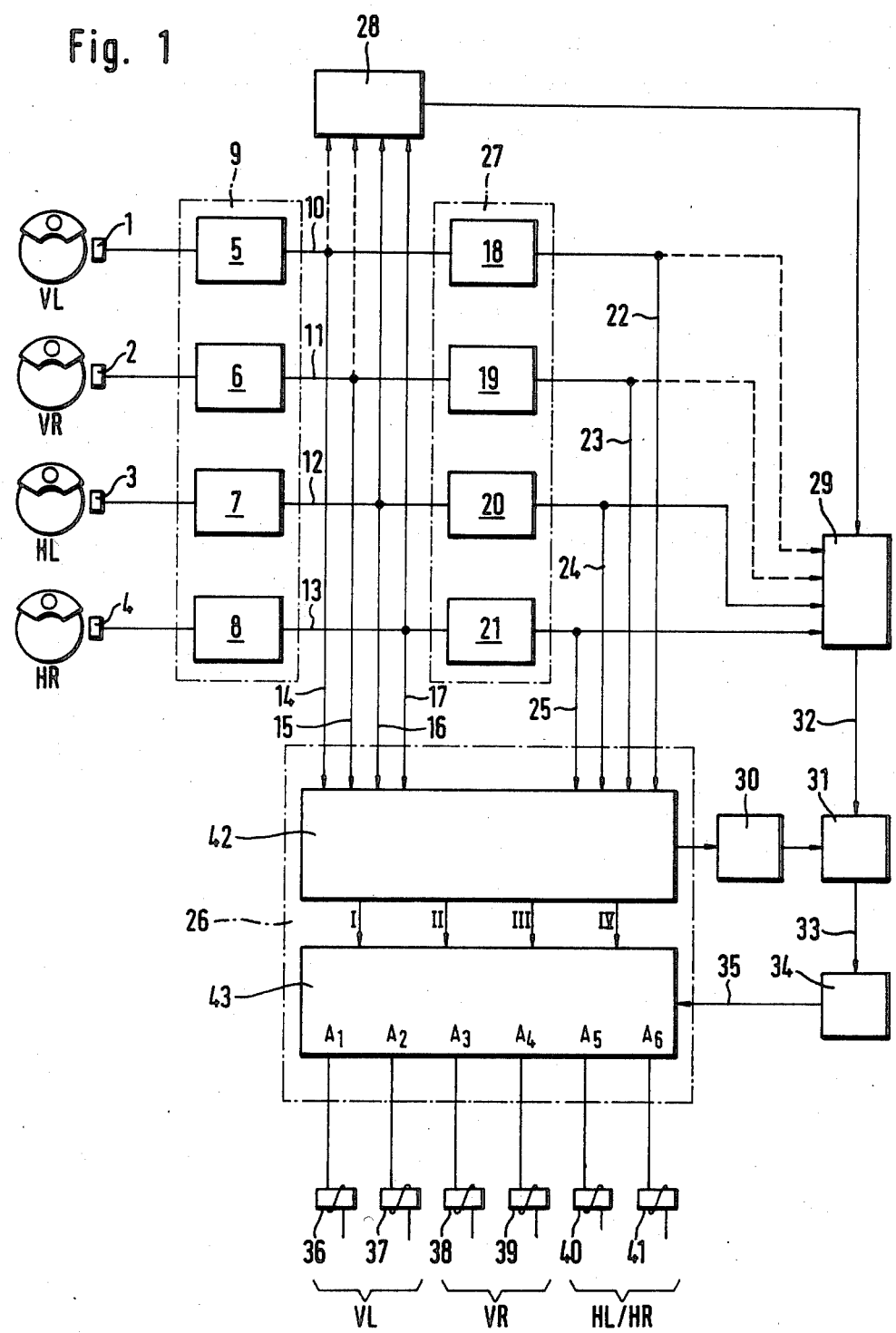
FIG. 1 shows a block diagram of the major electronic units of a circuit arrangement according to this invention in a schematically simplified manner.

In the block diagram according to FIG. 1, the front wheels of a automotive vehicle are referred to by VL, VR, the rear wheels being referred to by HL, HR. Wheel sensors 1-4 are provided for detecting the rotational behavior of the individual wheels. The wheel sensors 1-4 here are designed as inductive transducers wherein a toothed disk rotating with the wheel induces an electric alternating signal the frequency of which is proportional to the rotation of the wheel.

After handling and amplification of the sensor signals in individual (5-8) circuits or in circuits combined into a unit 9 signals proportional to the velocites of the individual wheels are available in the signal lines 10-13. The signals, on the one hand, are directly fed into an electronic circuit 26 by way of the lines 14-17 and, on the other hand by way of the differentiation stages 18-21 and by way of the signal lines 22-25. In circuit 26 the signals are logically combined and further processed for the purpose of generating braking pressure control signals. The individual differentiation stages 18-21 likewise may be combined into a common circuit 27. The velocity signals differentiated in the stages 18-21 or 27, respectively, represent the momentary deceleration of acceleration of the individual vehicle's wheels.

Further, the illustrated circuit arrangement comprises a comparator 28 and a selection circuit 29 by means of which the velocity and deceleration of the momentarily fastest wheel may be identified and evaluated for influencing the control circuit. Upon instabilization of a vehicle's wheel an output signal of circuit 26 activates a time element or a switch 30 which thereupon determines the deceleration of the momentarily fastest wheel, generally of a rear wheel HL or HR and infers the momentary friction value or rather friction coefficient between the tires and the road and thus the momentary road condition from this deceleration value. To this end the friction coefficient identification circuit 31 is fed with an electric signal by way of a signal line 32, the electric signal corresponding to the deceleration of the fastest wheel or rear wheel, respectively. By means of the friction coefficient determined by the circuit 31 and by means of a circuit 34 connected with the friction coefficient identification circuit 31 by way of a signal line 33 a reference velocity or a value is obtained through extrapolation, which influences the reference velocity, and is fed into circuit 26 by way of a signal line 35.

By means of the vehicular reference velocity obtained through extrapolation and serving as a reference value in determining the most favorable braking pressure variation during the slip control phase control phases are formed in the circuit 26. Thus, the time and the time duration of the output signals $A_1$ through $A_6$ of the circuit 26 is determined. The output signals $A_1$ through $A_6$, on their part, determine the control times of solenoid valve pairs 36, 37, 38, 39 and 40, 41. The solenoid valves directly control the braking pressure or rather the braking pressure variation in the wheel brakes of the front wheels VL, VR and of the rear wheels HL, HR. In the illustrated example, the braking pressure in the front wheels is controlled individually by way of the valve pairs 36, 37 and 38, 39, respectively, whereas the braking pressure at the rear axle is controlled concurrently buy way of a common valve pair 40, 41.

The broken line of the feeding lines communicating with the front wheel sensors and leading to the circuits 28, 29 indicates that the connections may be dispensed with in some cases. With the usual brake dimensioning the front wheels will namely always lock before the rear wheels. Thus, for carrying out the present invention, it may be sufficient to compare the velocities of the rear wheels and to evaluate the deceleration of the fastest rear wheel for the determination of the friction coefficient.

Circuit 26 in the embodiment according to FIG. 1 is split up in two units 42, 43 out of which unit 42 generates braking pressure control signals for four control circuits I-IV individually, which, subsequently, are modified in unit 43 in dependence on the momentary friction coefficient or rather by way of the information fed in by way of the signal line 35.

Figure 2A:
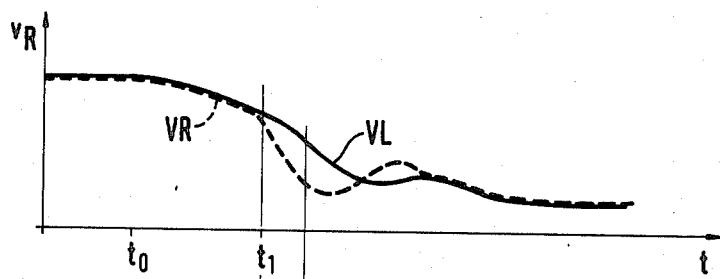
FIGS. 2a, 2b, 2c, 2d, 2e, and 2f show individual vehicle's wheels and the braking pressure variation during a controlled braking operation as a function of time by means of the circuit according to FIG. 1.
Figure 2B:
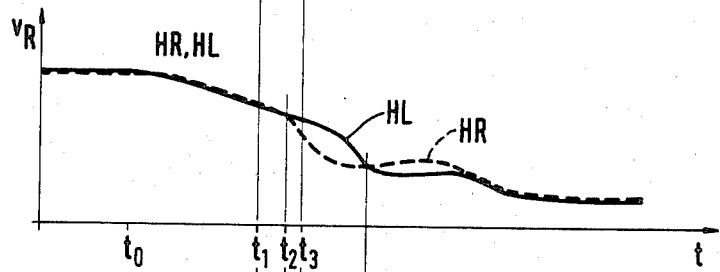
Figure 2C:
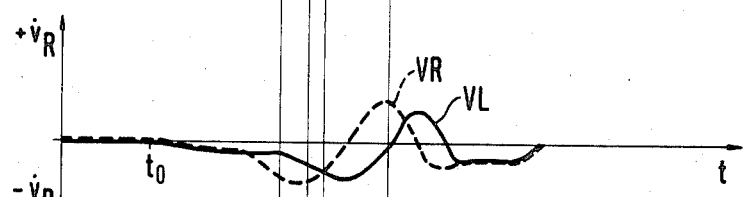
Figure 2D:
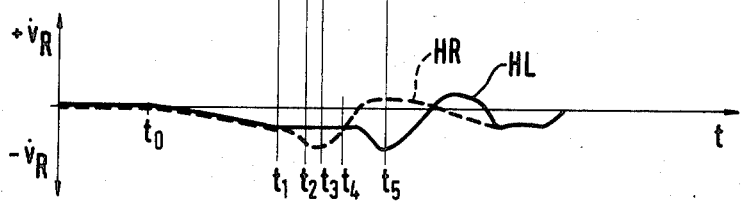
Figure 2E:
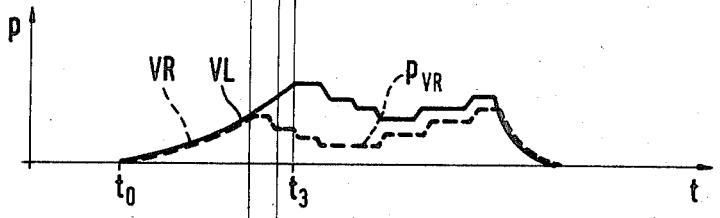
Figure 2F:
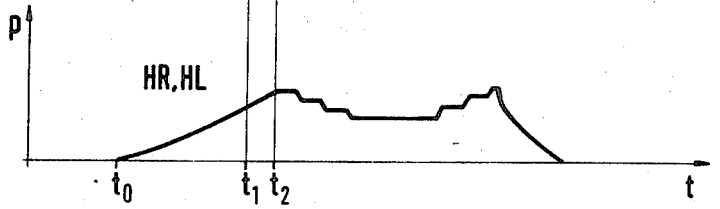

The rotational behavior of the individual vehicle wheels and the braking pressure variation in the wheel brakes during a braking operation are illustrated by the diagrams of FIGS. 2a through 2f. The course of the curves in FIGS. 2a and 2b represents the wheel velocites $v_R$ of the two front wheel VR, VL (FIG. 2A) and of the two rear wheels HR, HL (FIG. 2b). The respective wheel deceleration $-v_R$ and wheel acceleration $+v_R$ are represented in FIGS. 2c and 2d. The curves of FIGS. 2e and 2f show the individually controlled braking pressure variation in the front wheel brakes VR, VL and the concurrent braking pressure in the rear wheels HR, HL.

The braking operation starts at time $t_0$. A first instability or lock-up tendency occurs at time $t_1$, and that at the right front wheel VR the rotational behavior of which is illustrated by broken characteristic lines in FIGS. 2a and 2c. The instability leads (see FIGS. 2e) at once to keeping constant and, subsequently, to the reduction of the braking pressure $p_{VR}$ in the wheel brake cylinder of the right front wheel VR. At time $t_2$ a rear wheel (HR) shows a lock-up tendency, the second front wheel VL revealing a lock-up tendency at time $t_3$.

From FIGS. 2b and 2d it can be seen that during the initial phase of braking it is possible to gain a safe information on the deceleration of the vehicle from the rotational behavior of the fastest rear wheel (in the Figures this is the left rear wheel HL until time $t_5$) as this rear wheel is continuing to run stable while the front wheels have reached the adherence limits and more or less show a tendency to lock.

The vehicular deceleration present at the time of instabilization of the from wheels which in the described example corresponds wit the deceleration $v_R$ of the fastest rear wheel HL between approximately $t_1$ and $t_4$ is a measure of the momentary friction value or friction coefficient ($\mu$) between road surface and tires. Hence it follows that $\mu = a$, "a" being the vehicular deceleration and "g" being the acceleration due to gravity.

Now the further pressure variation or rather the control scheme or control program is adjusted as a function of the level of the momentary friction coefficient which decisively is determined by the road conditions. For instance, if the friction coefficient $\mu$ is small in the initial phase of braking which is of interest in this case, e.g.. below 0.3, a reference velocity with a small gradient is selected as reference value for the braking pressure modulation. If, however, a high vehicular deceleration (above 0.3 g) is registered this indicates a dry road or rather a high friction coefficient.

Thus, in order to achieve a short stopping distance the reference value or reference velocity by means of which the braking pressure is varied should have a steep gradient.

Figure 3:
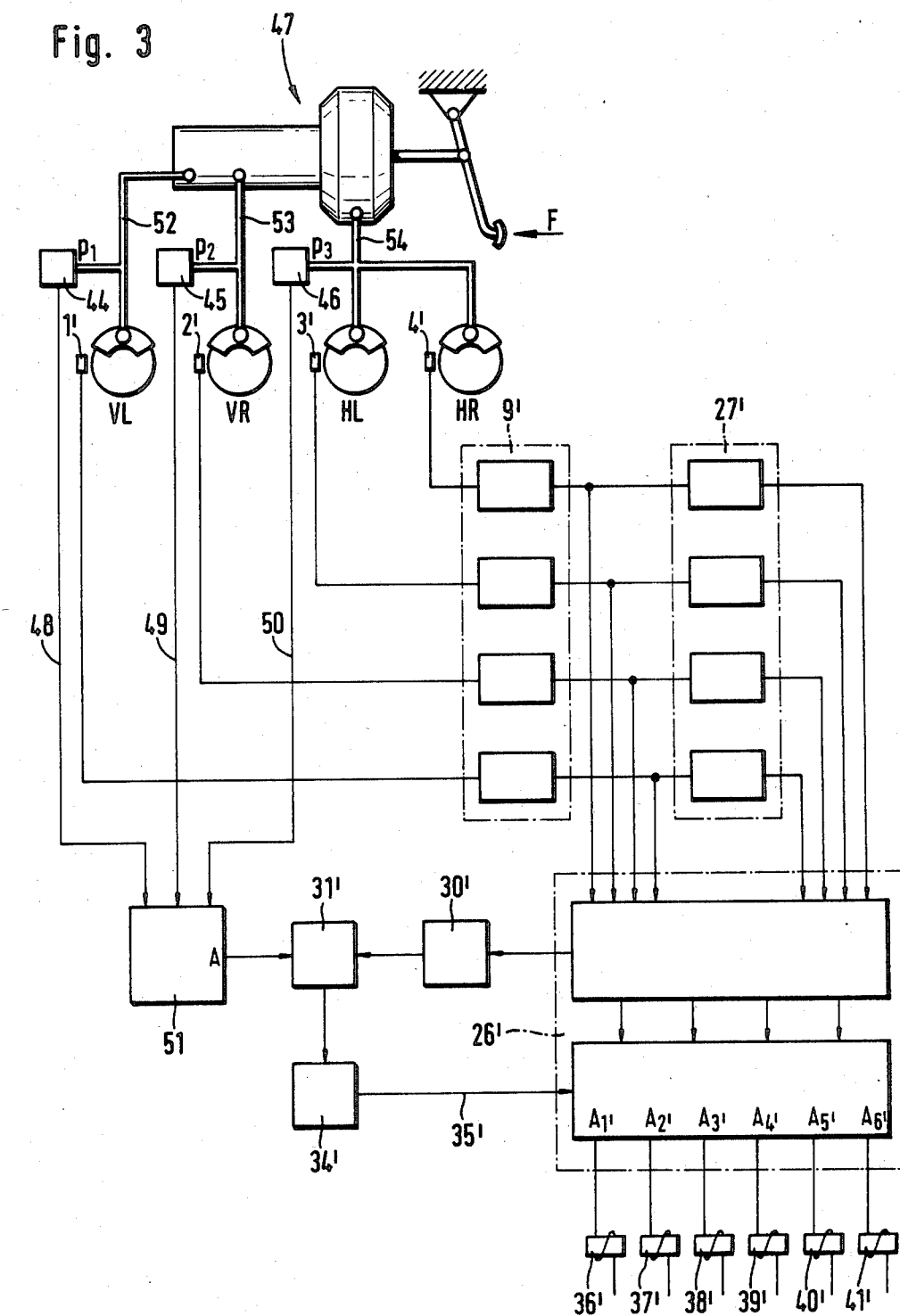
FIG. 3 shows a further embodiment of the present invention, the mode of representation being the same as in FIG. 1.

A modified embodiment of the present invention is shown in FIG. 3. Contrary to the embodiment described with reference to FIG. 1, here, the information on the friction coefficient or rather on the road condition in the event of an imminent lock-up of a vehicle wheel is obtained by measurement of the braking pressure prevailing at this time. To this end, the circuit according to FIG. 3 is equipped with pressure sensors 44, 45, 46 by means of which the momentary braking pressure $p_1$, $p_2$, $p_3$ in the three hydraulically separated brake circuit 52, 53, 54 of a braking pressure generator 47 can be determined. Electric signals corresponding to the prssures $p_1$, $p_2$, $p_3$ are fed to a handling and evaluation circuit 51 by way of signal lines 48, 49, 50. At the output A of said circuit 51, an electronically processable signal will be available.

Connected to the brake circuits 52, 53, 54 of the braking pressure generator 47 are the symbolically represented wheel brake of the wheels VL, VR, HL, HR. In the embodiment according to FIG. 3, the rotational behavior of the wheels is detected in the manner already described with reference to FIG. 1 by means of inductive sensors 1', 2', 3', 4'. The signals of the sensors are subsequently handled in a circuit 9' and are examined in a differentiation stage 27' with regard to their time variation. Velocity as well as deceleration and/or acceleration signals of the individual wheels are fed into a circuit 26' in the same manner as into the circuit 26 of FIG. 1. At the outputs $A_1$ through $A_6$ of the circuit 26' there will be signals available for the control of multi-directional valves 36' through 41'—i.e., braking pressure control signals.

Upon the occurrence of a lock-up tendency a friction coefficient identification circuit 31' is actuated by way of any activation circuit 30'. The pressure prevailing at this time, i.e., upon the occurrence of the lock-up tendency, is evaluated by the circuit 31' as a criterion of the momentary friction coefficient and leads to an output signal by means of which, after processing in a circuit 34', the reference value which is decisive for the control of the braking pressure, namely the vehicular reference velocity, is determined by means of extrapolation. By way of the signal line 35', the output signal of the circuit 34' leads to the corresponding variation of the braking pressure control signals generated in the circuit 26'.

The electric circuits described with reference to FIGS. 1 and 3 may be combined into a sole electronic circuit or into a few electronic circuits or may be replaced by programable circuits, i.e.., program-controlled circuits, such as micro-computers or micro-controllers.

According to another embodiment of this invention, measurement and evaluation of the braking pressure for the determination of the momentary friction coefficient may be combined with the principle of the circuit arrangement of FIG. 1, namely the principle of the friction coefficient determination from the behavior of the momentarily fastest wheel (rear wheel). This will enhance the safety and reliability of the friction coefficient determination.

What is claimed is:

1. A circuit arrangement for adapting slip control of an anti-skid brake system of an automotive vehicle to the momentary friction value between a road surface and the vehicle tires comprising, sensors for the detection of the rotational behavior of the wheels, circuits for the handling and differentiation of the sensor signals as well as for the generation of braking pressure control signals by means of which electromagnetically operable multi-directional valves in the pressure medium paths of the brake system are controllable, and including circuits (28, 29) for the identification of the velocity ($v_R$) and of the deceleration ($v_R$) of the momentarily fastest wheel and a friction coefficient identification circuit (31) by means of which, upon the instabilization of a wheel, the braking pressure control signals are variable as a function of the deceleration ($v_R$) of the momentarily fastest wheel.

2. A circuit arrangement for adapting slip control of an anti-skid brake system of an automotive vehicle to the momentary friction value between a road surface and the vehicle tires comprising, sensors for the detection of the rotational behavior of the wheels, circuits for the handling and differentiation of the sensor signals as well as for the generation of braking pressure control signals by means of which electromagnetically operable multi-directional valves in the pressure medium paths of the brake system are controllable, and sensors for detecting the braking pressure in the pressure medium circuits of the brake system, and including a friction coefficient identification circuit (31') and circuits (34') by means of which, upon the instabilization of a wheel, the braking pressure control signals are directly or indirectly variable as a function of one of the momentary braking pressure in the wheel brake of the instabilizing wheel or an average momentary braking pressure.

3. A circuit arrangement as claimed in claim 2, wherein the variation of the vehicular reference velocity is changed by means of the output signals of the friction coefficient identification circuits (31, 31') and therefore adapted to the momentary friction coefficient.

4. A circuit arrangement as claimed in claim 3, further including circuits (28, 29) for the identification and determination of the deceleration ($v_R$) of the fastest wheel and sensors (44–46) for detecting the momentary braking pressure in the individual pressure medium circuits (52, 53, 54) and friction coefficient identification circuits (31, 31') by means of which, upon the instabilization of a wheel, the braking pressure control signals are variable as a function of the deceleration ($v_R$) of the fastest wheel and the momentary braking pressure.

5. A process for adapting slip control of an anti-skid brake system for an automotive vehicle to the momentary friction value between road surface and tires, said process including the steps of measuring the rotational behavior of the vehicle wheels and the vehicular velocity or a derived value and generating measured signals therefrom, generating braking force pressure control signals from the measured signals by means of logical combination and signal processing; upon the instabilization of a wheel such as the identification of a wheel lock-up tendency, keeping the braking force at the respective wheel constant or reducing and reincreasing the brake force at the appropriate time by said control signals, wherein upon the instabilization of a wheel, evaluating the velocity (VR) and the deceleration (VR) of the momentarily fastest wheel as criteria of the vehicular velocity and vehicular deceleration and, deriving the momentary friction value from said values and adjusting the pressure modulation of slip control as a function of friction value to a control scheme or control program adapted to the friction value level.

6. The process according to claim 5, including the steps of applying a higher braking force to the front wheels (VR, VL) than to the rear wheels (HR, HL) and evaluating only at the time of the first instabilization of a front wheel (VR, VL) caused by a braking operation the deceleration of the fastest rear wheel is evaluated as a criterion of the momentary friction value or of the friction value momentarily achievable.

* * * * *